United States Patent
Barber et al.

(10) Patent No.: US 10,066,697 B2
(45) Date of Patent: Sep. 4, 2018

(54) THREE PARAMETER ISOLATORS CONTAINING ROLLING SEAL DAMPER ASSEMBLIES

(71) Applicant: HONEYWELL INTERNATIONAL INC., Morris Plains, NJ (US)

(72) Inventors: Tim Daniel Barber, Litchfield Park, AZ (US); Timothy Hindle, Peoria, AZ (US); Dylan Jaksich, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/412,525

(22) Filed: Jan. 23, 2017

(65) Prior Publication Data

US 2018/0209508 A1    Jul. 26, 2018

(51) Int. Cl.
*F16F 15/02* (2006.01)
*F16F 9/36* (2006.01)
(Continued)

(52) U.S. Cl.
CPC .......... *F16F 15/022* (2013.01); *F16F 9/3257* (2013.01); *F16F 9/362* (2013.01);
(Continued)

(58) Field of Classification Search
CPC .. F16F 15/022; F16F 9/20; F16F 9/362; F16F 9/3257; F16F 13/007; F16F 1/02;
(Continued)

(56) References Cited

U.S. PATENT DOCUMENTS 2,720,218 A   10/1955   Otto
3,266,603 A    8/1966   Kamimoto
(Continued)

FOREIGN PATENT DOCUMENTS

EP    2801734 A1    11/2014
EP    2876327 A2     5/2015
(Continued)

OTHER PUBLICATIONS

Extended EP Search Report for Application No. 18152853.0 dated Jul. 4, 2018.

*Primary Examiner* — Vishal R Sahni
(74) *Attorney, Agent, or Firm* — Lorenz & Kopf, LLP (57) ABSTRACT

Embodiments of three parameter isolators including rolling seal damper assemblies are provided. In one embodiment, the three parameter isolator includes first and second isolator end portions, which are opposed along a working axis. A main spring and a tuning spring are mechanically coupled in parallel between the first and second isolator end portions. A rolling seal damper assembly is further mechanically coupled between the first and second isolator end portions in parallel with the main spring and in series with the tuning spring. The rolling seal damper assembly includes a first hydraulic chamber, a second hydraulic chamber fluidly coupled to the first hydraulic chamber, and first and second rolling diaphragm seals partially bounding the first and second hydraulic chambers, respectively. In certain implementations, the rolling seal damper assembly also contains a thermal compensator piston to which the first rolling diaphragm seal is attached.

15 Claims, 5 Drawing Sheets

(51) Int. Cl.
*F16F 9/32* (2006.01)
*F16F 13/00* (2006.01)

(52) U.S. Cl.
CPC ........ *F16F 13/007* (2013.01); *F16F 2222/12* (2013.01); *F16F 2232/08* (2013.01); *F16F 2238/026* (2013.01); *F16F 2238/04* (2013.01)

(58) Field of Classification Search
CPC ........ B64G 1/641; B64G 1/283; B64G 1/285; B64G 1/286
See application file for complete search history.

(56) References Cited

U.S. PATENT DOCUMENTS

| | | | |
|---|---|---|---|
| 3,677,598 A | 7/1972 | Becker | |
| 3,730,473 A | 5/1973 | Pepi | |
| 4,022,448 A | 5/1977 | Reeder | |
| 4,655,438 A | 4/1987 | Cameron | |
| 5,318,156 A | 6/1994 | Davis | |
| 5,332,070 A * | 7/1994 | Davis | F16F 9/16 188/280 |
| 5,489,009 A | 2/1996 | Kawamata et al. | |
| 6,817,597 B1 | 11/2004 | Thurow et al. | |
| 6,848,980 B2 | 2/2005 | Chen et al. | |
| 7,802,776 B2 * | 9/2010 | Behmenburg | B60G 17/0485 188/298 |
| 8,006,963 B2 * | 8/2011 | Gleu | F16F 9/055 267/64.19 |
| 8,899,389 B2 * | 12/2014 | Smith | F16F 15/022 188/276 |
| 9,068,554 B2 | 6/2015 | Healy | |
| 9,670,983 B2 * | 6/2017 | Martinez | F16F 15/022 |
| 2012/0292476 A1 * | 11/2012 | Smith | B64G 1/641 248/550 |
| 2014/0312198 A1 * | 10/2014 | Martinez | F16F 15/022 248/562 |
| 2016/0010717 A1 * | 1/2016 | Tosovsky | F16F 9/537 188/267.2 |

FOREIGN PATENT DOCUMENTS

| | | |
|---|---|---|
| EP | 3121480 A2 | 1/2017 |
| JP | H074461 A | 1/1995 |

\* cited by examiner

THREE PARAMETER ISOLATORS CONTAINING ROLLING SEAL DAMPER ASSEMBLIES

TECHNICAL FIELD

Embodiments of the present invention relates generally to isolators and, more particularly, to three parameter isolators containing rolling seal damper assemblies.

BACKGROUND

Vibration isolation systems are employed in a wide variety of applications to minimize the transmission of disturbances forces between two bodies or structures. Satellite and other spacecraft, for example, are commonly equipped with vibration isolation systems to minimize the transmission of vibratory forces or jitter emitted from attitude adjustment devices (e.g., control moment gyroscopes or reaction wheel arrays) to other vibration-sensitive components (e.g., optical payloads) onboard the spacecraft. The performance of such vibration isolation system may be determined by several factors including the manner in which the isolators are arranged and the vibration attenuation characteristics of each individual isolator. Vibration isolation systems employing three parameter isolators, which behave mechanically as a primary spring in parallel with a series-coupled tuning spring and damper, provide superior attenuation of high frequency vibratory forces as compared to vibration isolation systems employing other types of passive isolators, such as viscoelastic isolators. An example of a three parameter isolator is the D-STRUT® isolator developed and commercially marketed by Honeywell, Inc., currently headquartered in Morristown, N.J. Such isolators are often passive, single Degree of Freedom (DOF), axially-damping devices well-suited for usage within multi-point mounting arrangements. While capable of providing high performance vibration attenuation, existing three parameter isolators remain limited in certain respects. For example, high manufacturing costs and lengthy lead times have hampered the widespread adoption of three parameter isolators in non-spaceborne applications.

BRIEF SUMMARY

Embodiments of three parameter isolators including rolling seal damper assemblies are provided. In one embodiment, the three parameter isolator includes first and second isolator end portions, which are opposed along a working axis. A main spring and a tuning spring are mechanically coupled in parallel between the first and second isolator end portions. A rolling seal damper assembly is further mechanically coupled between the first and second isolator end portions in parallel with the main spring and in series with the tuning spring. The rolling seal damper assembly includes a first hydraulic chamber, a second hydraulic chamber fluidly coupled to the first hydraulic chamber, and first and second rolling diaphragm seals partially bounding or defining the first and second hydraulic chambers, respectively. In certain implementations, the rolling seal damper assembly also contains a thermal compensator piston to which the first rolling diaphragm seal is sealingly attached.

In another embodiment, the three parameter isolator includes an outer isolator housing assembly, a main spring forming part of the outer isolator housing assembly, and a tuning spring in parallel with the main spring and contained within the outer isolator housing assembly. The three parameter isolator further includes a rolling seal damper assembly in parallel with the main spring, in series with the tuning spring, and further contained within the outer isolator housing assembly. The rolling seal damper assembly includes a first hydraulic chamber contained within the outer isolator housing assembly, and a first rolling diaphragm seal at least partially defining the first hydraulic chamber. In certain implementations, the rolling seal damper assembly further may further include a second rolling diaphragm seal, and the first and second rolling diaphragm seals may be located on opposing sides of the damper piston as taken along a working axis of the three parameter isolator. The first and second rolling diaphragm seals may be substantially coaxial with the working axis.

In a further embodiment, the three parameter isolator includes inner and outer load paths extending in parallel through at least a portion of the three parameter isolator. A main spring is positioned in the outer load path, a tuning spring is positioned in the inner load path, and a rolling seal damper assembly is positioned in the inner load path. The rolling seal damper assembly includes: (i) a thermal compensator piston having an outer annular sidewall, (ii) static structure surrounding the thermal compensator piston and having an inner annular sidewall, (iii) a thermal compensator spring biasing the thermal compensator piston toward an extended position, and (iv) a rolling diaphragm seal extending between the thermal compensator piston and the static structure. The rolling diaphragm seal contacts the inner and outer annular sidewalls at least when the thermal compensator piston resides in the extended position.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Single degree of Freedom (DOF), axially-damping three parameter isolators have been extensively engineered, particularly for spaceborne applications, and are capable of providing highly effective vibration attenuation. However, as noted in the foregoing section entitled BACKGROUND, the manufacture of three parameter isolator is typically a highly costly and lengthy endeavor. A primary reason for this is the inclusion of edge-welded metal bellows in many three parameter isolator designs. Edge-welded metal bellows are often utilized in three parameter isolator designs as such bellows can provide essentially frictionless, zero leakage operation over extended usage in terrestrial and spaceborne environments. Additionally, edge-welded metal bellows provide an enhanced stroke range-to-bellows length as compared to other types of metal bellows (e.g., deposited nickel bellows), which, in turn, allows favorable reductions in isolator size and weight. Edge-welded metal bellows are, however, costly to produce and usually require lengthy lead times due, at least part, to the manually-intensive nature of the edge welding process utilized to fabricate such bellows. While dynamic seals, such as sliding O-ring seals, can potentially be utilized in place of edge-welded bellows to bring about reductions in manufacturing costs, dynamic seals are often prone to leakage and may be incompatible with isolator designs requiring frictionless or near frictionless operation.

The following describes embodiments of three parameter isolators including rolling seal damper assemblies. The rolling seal damper assembly contains flexible rolling diaphragm seals, which seal hydraulic compartments or chambers included within the damper assembly. The rolling seal damper assembly may be placed in parallel and in series with a main spring and a tuning spring, respectively, further included in the three parameter isolator. In certain embodiments, the rolling seal damper assembly may also contain a Thermal Compensator (TC) including a TC piston, TC chamber, and a rolling diaphragm seal, which is sealing joined to the TC piston and which at least partially defines the TC chamber. Additionally or alternatively, the rolling seal damper assembly may further include a linear guide system, which confines off-axis movement of a damper piston structure to which at least one of the rolling diaphragm seals is sealingly attached. Relative to damper assemblies containing edge-welded metal bellows, reductions in manufacturing costs and lead times can be realized through the strategic incorporation of rolling diaphragm seals into the damper assembly, while frictionless damping motion and low or zero leakage operation is still provided. The rolling seal damper assembly may also provide reductions in the overall length and weight of the three parameter isolator. Still further benefits that may be provided by embodiments of the below-described three parameter isolator may include, but are not limited to, an extensive operative temperature range, robust vibration insensitivity, relatively broad stroke capabilities, high pressure capabilities, very low static spring rates, and long service lifespans. Finally, and in contrast to metal bellows-containing damper assemblies, the below-described rolling seal damper assemblies allow disassembly (at the damper assembly level) as may facilitate more timely damper draining and re-filling with different fluid types of damper fluid during an initial tuning process.

Embodiments of the three parameter isolator described herein can be utilized in various different types multipoint mounting arrangements. Usage of the below-described three parameters isolators is not restricted to any particular application or environment. It is noted, however, that embodiments of the three parameter isolators may be particularly well-suited for usage in terrestrial applications due, at least in part, to reductions in manufacturing cost. For example, embodiments of the three parameter isolator may be advantageously utilized within non-spaceborne vibration isolation systems, such as a Gas Turbine Engine (GTE) isolation system. An exemplary embodiment of a single DOF (axially-damping), three parameter isolator including a rolling seal damper assemblies is described below in conjunction with FIGS. 3-5. First, however, an overarching description of a multipoint vibration isolation system is provided below in conjunction with FIG. 1, and a general description of three parameter isolators that may be included in a vibration isolation system, such as a GTE isolation system, is provided below in conjunction with FIG. 2.

Figure 1:
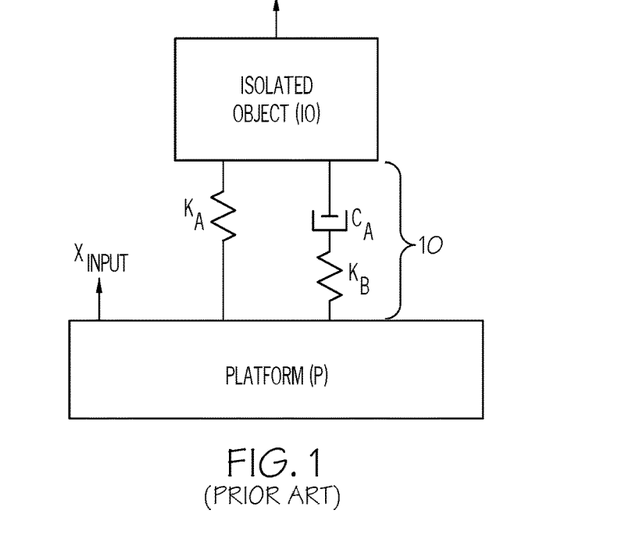
FIG. 1 is a schematic of a passive three parameter vibration isolator disposed between two structures and illustrated in accordance with the teachings of prior art.

FIG. 1 is a schematic representation of a passive three parameter isolator 10, as illustrated in accordance with the teachings of prior art. Three parameter isolator 10 is mechanically coupled between an isolated object "10" and a platform "P." In one embodiment, platform P is a satellite or other spacecraft, while isolated object 10 is an optical bench or other vibration-sensitive payload carried by the spacecraft. In another embodiment, platform P is an aircraft and isolated object 10 is a GTE, such as an Auxiliary Power Unit (APU), which generates vibrations that are desirably attenuated prior to reaching the aircraft fuselage. In still further embodiments, platform P can be a different type of vehicle or structure, while isolated object 10 can assume various other forms. As modeled in FIG. 1, three parameter isolator 10 includes the following mechanical elements or components: (i) a first spring component $K_A$, which is mechanically coupled between isolated object 10 and platform P; (ii) a second spring component KB, which is mechanically coupled between isolated object 10 and platform P in parallel with first spring component $K_A$; and (iii) a damper CA, which is mechanically coupled between isolated object 10 and platform P in parallel with the first spring component $K_A$ and in series with the second spring component KB. Transmissibility of three parameter isolator 10 is expressed by the following equation:

$$T(\omega) = \frac{X_{output}(\omega)}{X_{input}(\omega)} \qquad \text{EQ. 1}$$

wherein $T(\omega)$ is transmissibility, $X_{output}(\omega)$ is the output motion of isolated object 10, and $X_{input}(\omega)$ is the input motion imparted to isolator 10 by platform P.

Figure 2:
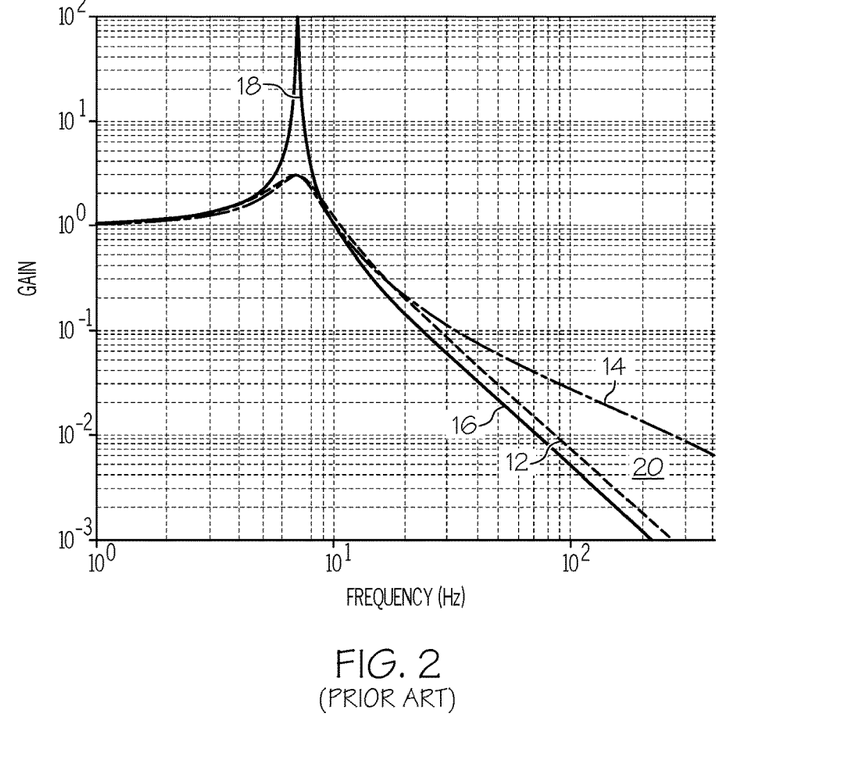
FIG. 2 is a transmissibility plot of frequency (horizontal axis) versus gain (vertical axis) illustrating the transmissibility profile of the three parameter isolator shown in FIG. 1 as compared to the transmissibility profiles of a two parameter isolator and an undamped device.

FIG. 2 is a transmissibility plot illustrating the damping characteristics of three parameter isolator 10 (curve 12) as compared to a two parameter isolator (curve 14) and an undamped device (curve 16). As indicated in FIG. 2 at 18, the undamped device (curve 16) provides a relatively high peak gain at a threshold frequency, which, in the illustrated example, is moderately less than 10 hertz. By comparison, the two parameter device (curve 14) provides a significantly lower peak gain at the threshold frequency, but an undesirably gradual decrease in gain with increasing frequency after the threshold frequency has been surpassed (referred to as "roll-off"). In the illustrated example, the roll-off of the two parameter device (curve 14) is approximately 20 decibel per decade ("dB/decade"). Lastly, the three parameter device (curve 12) provides a low peak gain substantially equivalent to that achieved by the two parameter device (curve 14) and further provides a relatively steep roll-off of about 40 dB/decade. The three parameter device (curve 12) thus provides a significantly lower transmissibility at higher frequencies, as quantified in FIG. 2 by the area 20 bounded by curves 12 and 14. By way of non-limiting example, further discussion of three parameter isolators can be found in U.S. Pat. No. 5,332,070, entitled "THREE PARAMETER VISCOUS DAMPER AND ISOLATOR," issued Jan. 26, 1994; and U.S. Pat. No. 7,182,188 B2, entitled "ISOLATOR USING EXTERNALLY PRESSURIZED SEALING BELLOWS," issued Feb. 27, 2007; both of which are assigned to assignee of the instant application and are hereby incorporated by reference.

Passive three parameter isolators, such as isolator 10 schematically illustrated in FIG. 1, can thus be tuned to provide superior damping characteristics (e.g., lower overall transmissibilities) as compared to undamped devices and two parameter devices over a given frequency range. Furthermore, in contrast to viscoelastic dampers, the stiffness and damping characteristics of passive three parameter isolators are independently tunable. Consequently, when six or more isolators are arranged in a multi-point system, each three parameter isolator can be specifically tuned to provide optimal stiffness and damping in each degree of freedom to minimize vibration transmittance between a platform and an isolated object supported thereby. An exemplary embodiment of a single DOF (axially-damping), three parameter isolator including a rolling seal damper assemblies will now be described below in conjunction with FIGS. 3-6.

Figure 3:
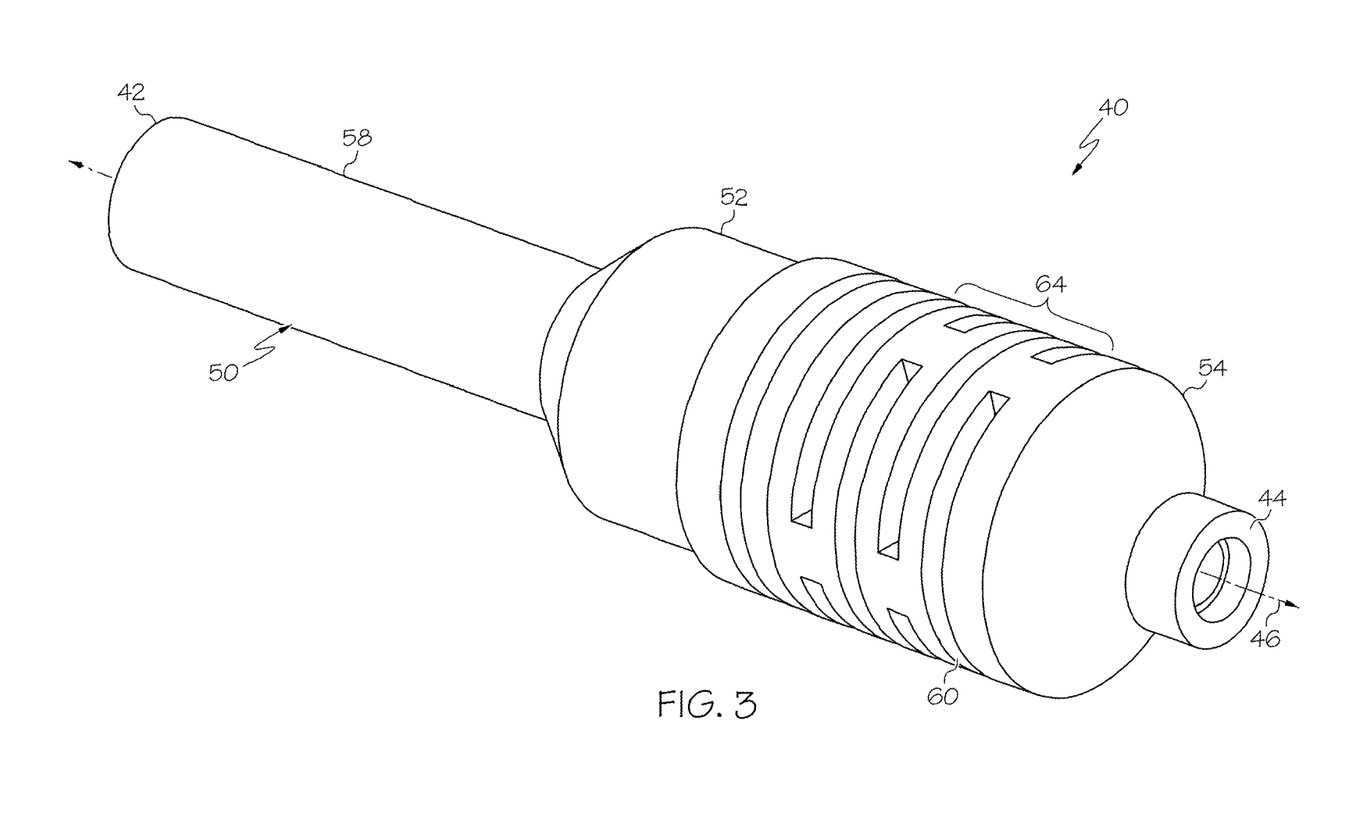
FIGS. 3 and 4 are isometric and cross-sectional views, respectively, of an exemplary three parameter isolator suitable for usage as one or all of the isolation devices shown in FIG. 1 and including a rolling seal damper assembly, as illustrated in accordance with an exemplary embodiment.
Figure 4:
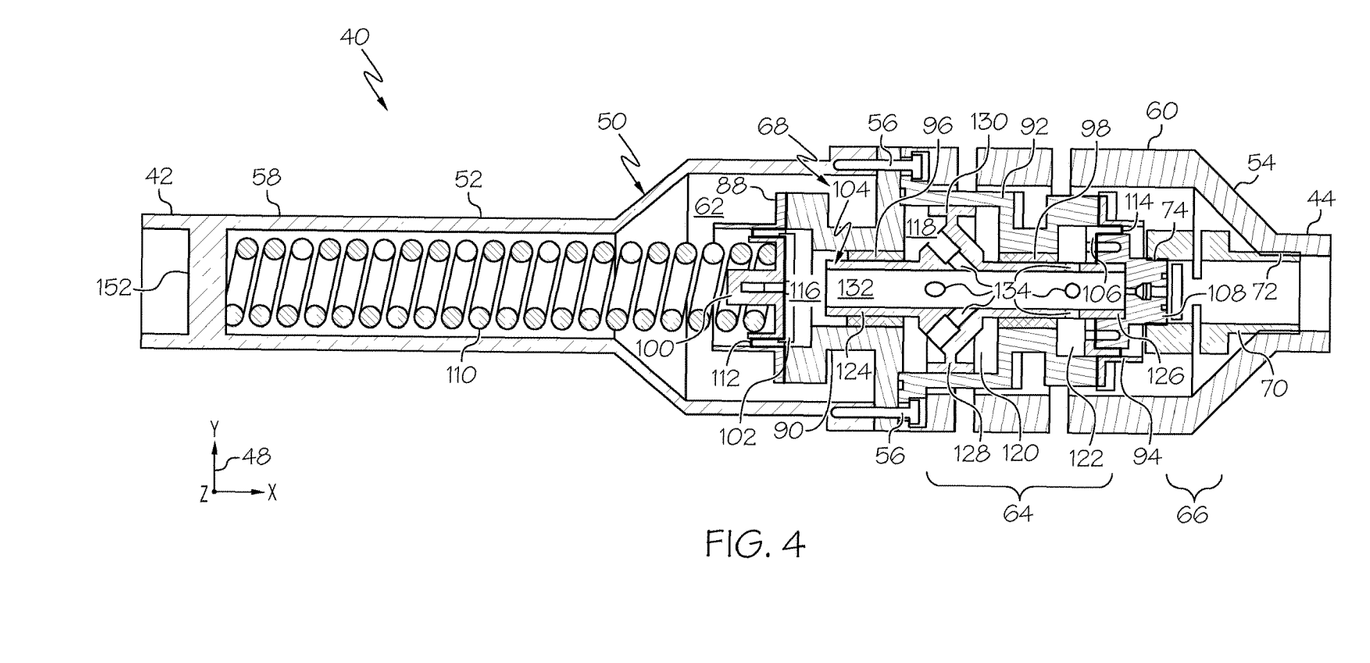

FIGS. 3 and 4 are isometric and cross-sectional views, respectively, of an exemplary embodiment of a three parameter isolator 40 suitable for usage as one or all of three parameter isolators 16 shown in FIG. 1. Exemplary three parameter isolator 40 includes a first isolator end portion 42 and a second, opposing end isolator portion 44. Isolator end portions 42, 44 are spaced along the longitudinal or working axis of isolator 40, which is represented in FIG. 3 by double-headed arrow 46 and corresponds to the X-axis identified in FIG. 4 by coordinate legend 48. Isolator end portions 42, 44 serve as opposing mechanical inputs/outputs of three parameter isolator 40. When isolator 40 is deployed within a vibration isolation system, first isolator end portion 42 can be mounted directly or indirectly to a platform (e.g., utilizing a mounting bracket), while first isolator end portion 44 of isolator 40 is attached directly or indirectly to the payload (e.g., first isolator end portion 44 may be bolted to or otherwise attached to a bench or palette supporting the payload). Alternatively, the orientation of three parameter isolator 40 may be inverted such that first isolator end portion 44 is mounted directly or indirectly to the platform, while first isolator end portion 42 is secured to the payload.

Three parameter isolator 40 further includes an outer isolator casing or housing assembly 50, which can be assembled from any number of discrete components or pieces. In the illustrated example, specifically, outer isolator housing assembly 50 is assembled from a first casing or housing piece 52 and a second casing or housing piece 54. Housing pieces 52, 54 are fixedly coupled utilizing, for example, a plurality of bolts 56 (FIG. 4) or other fasteners. Housing piece 52 includes a generally tubular main body, which terminates in an elongated stem portion 58. Stem portion 58 contains an elongated channel, which partially contains at a TC preload spring and serves as a guideway therefor, as described more fully below. Similarly, housing piece 52 has a generally tubular form factor and includes an annular sidewall 60, which circumscribes a generally cylindrical cavity 62. When joined, housing pieces 50, 52 combine to form an internal chamber or cavity 62 within outer isolator housing assembly 50. In further embodiments, outer isolator housing assembly 50 may include a different number of housing pieces, which are joined together in various permanent or non-permanent manners. Additionally, the components of isolator housing assembly 50 can be machined or otherwise fabricated to include various other application-specific structural features (e.g., flexures, mounting interfaces, and the like), which are not described herein in the interests of concision. Similarly, three parameter isolator 40 may include other components (e.g., check valves), which are not shown in FIGS. 3 and 4 for illustrative clarity.

As shown most clearly in FIG. 4, three parameter isolator 40 generally includes three mechanically active components or elements: (i) a primary or main spring 64, (ii) a secondary or "tuning" spring 66, and (iii) a rolling seal damper assembly 68. In the embodiment shown in FIGS. 4 and 5, main spring 64 may be integrally formed in the annular body of tubular housing piece 56 by, for example, machining. For example, main spring 64 may assume the form of a section of tubular housing piece 50 (in particular, a section of annular sidewall 60) from which material has been removed by laser cutting or a similar process to form a compressible resilient structure. In other embodiments, main spring 64 may be a discrete or independent element, such as a coil spring disposed between opposing isolator end portions 42, 44. In either case, main spring 64 is considered to form part of outer isolator housing assembly 50 in embodiments wherein main spring 64 forms, in essence, a compressible wall of the housing assembly.

Tuning spring 66 can also assume the form of a coil spring or another discrete, compressible structure, but is usefully implemented as a machined spring. For example, tuning spring 66 can be a machined spring formed in the outer annular wall of a tubular spring piece 70 contained within outer isolator housing assembly 50 and, specifically, within the central cavity of tubular housing piece 54. When three parameter isolator 40 is assembled, a first end of tubular spring piece 70 may be affixed to an interior portion of housing piece 52 by, for example, a threaded attachment interface 72 (FIG. 4). Conversely, the second, opposing end of tubular spring piece 70 may be attached to a mating end portion of rolling seal damper assembly 68 utilizing, for example, an annular bonding or threaded attachment interface 74 (FIG. 4). In further embodiments, one or both of springs 64, 66 can be realized as another type of compressible resilient structure, such as a gas spring.

Rolling seal damper assembly 68 includes a number of static components (that is, components that remain spatially fixed relative to outer isolator housing assembly 50 during operation of isolator 40), a number of translating components, multiple rolling diaphragm seals, and a number of hydraulic chambers, at least some of which are partially bound by the rolling diaphragm seals. In certain embodiments, rolling seal damper assembly 68 may further include a linear guide system, which confines linear movement of the damper piston to translation along working axis 46 (FIG. 3). Additionally or alternatively, rolling seal damper assembly 68 may include a thermal compensator (TC) piston in embodiments wherein it is desirable to accommodate temperature-induced variations in damping fluid volume. The particular design of rolling seal damper assembly 68 will vary among embodiments. However, by way of non-limiting example, additional description of rolling seal damper assembly 68 will now be provided in conjunction with FIGS. 3 and 4, as well as the exploded view of damper assembly 68 shown in FIG. 5.

Figure 5:
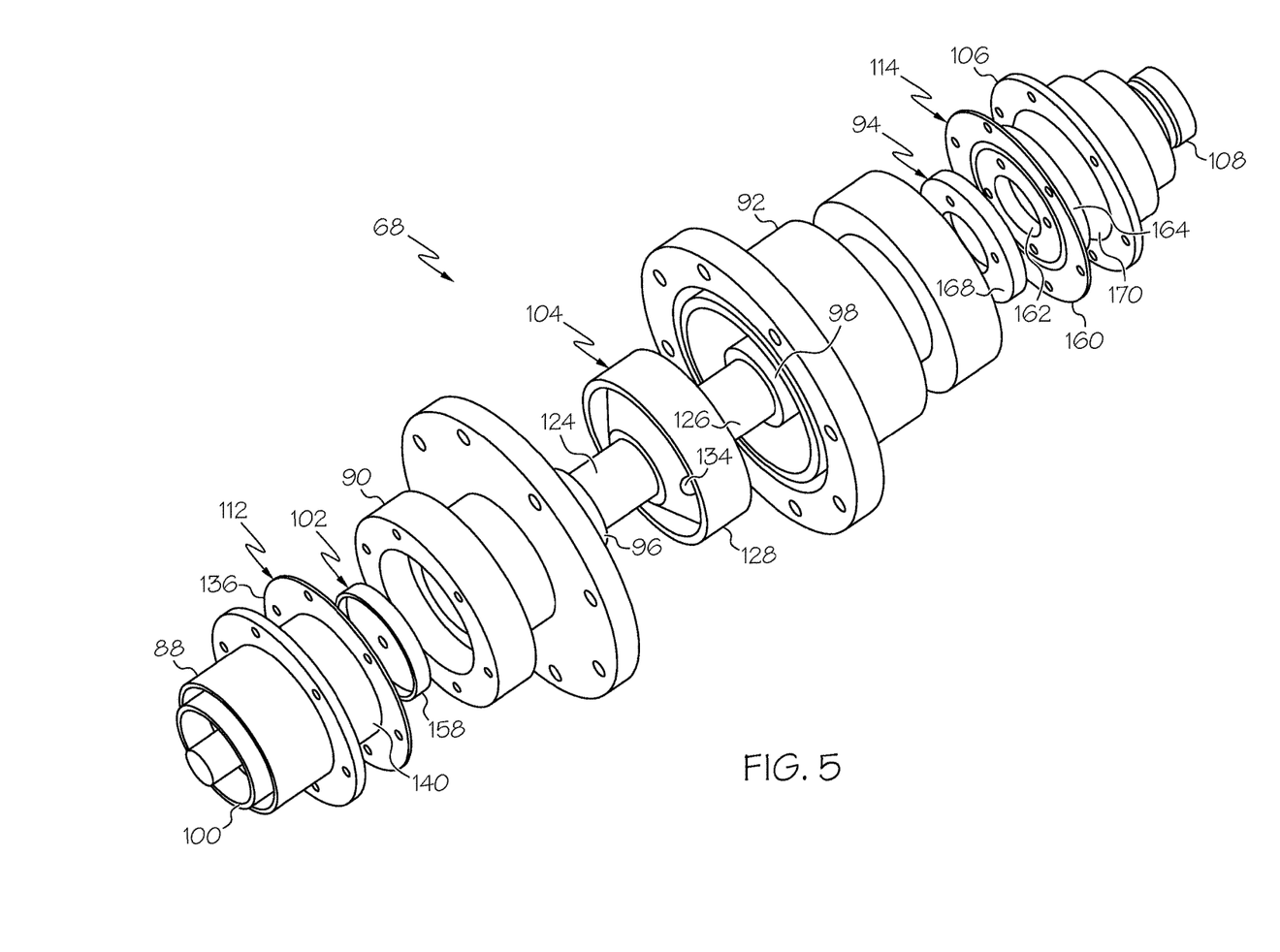
FIG. 5 is an exploded view of the rolling seal damper assembly included in the three parameter isolator shown in FIGS. 3 and 4.

Referring collectively to FIGS. 3-5, and as shown most clearly in FIGS. 4 and 5, rolling seal damper assembly 68 includes the following static components: (i) a first diaphragm seal clamp 88, (ii) a first damper housing assembly piece 90, (iii) a second damper housing assembly piece 92, (iv) a second diaphragm seal clamp 94, (v) a first bushing 96, and (vi) a second bushing 98. Progressing from left to right in FIGS. 4 and 5, the translating or movable components of damper assembly 68 include: (vii) a translating TC piston 100, (viii) a first translating seal plate 102, (ix) a translating piston structure 104, (x) a second translating seal plate 106, and (xi) a tuning spring connector piece 108. In addition to the afore-listed components, rolling seal damper assembly 68 also contains: (xii) a TC preload spring 110 (FIG. 4), (xiii) a first rolling diaphragm seal 112, (xiv) and a second rolling diaphragm seal 114. Finally, rolling seal damper assembly 68 still further contains first, second, third, and fourth hydraulic chamber, as identified in FIG. 4 by reference numerals 116, 118, 120, and 122, respectively.

Hydraulic chambers 116, 118, 120, 122 are fluidly interconnected and defined or bound by various different structural components of rolling seal damper assembly 68. With respect to hydraulic chamber 116, in particular, chamber 116 is predominately bound or defined by first rolling diaphragm seal 112, translating seal plate 102, and interior surfaces of damper housing assembly piece 90. To a lesser extent, hydraulic chamber 116 is defined by bushing 96 and a first end portion 124 of a piston shaft 124, 126 included in translating piston structure 104. Hydraulic chamber 118 is defined by damper housing assembly piece 90, bushing 96, damper housing assembly piece 92, and translating piston structure 104. With respect to translating piston structure 104, first end portion 124 of a piston shaft 124, 126 defines hydraulic chamber 118 to a lesser extent, while a first face of damper piston 128 further included in translating piston structure 104 defines chamber 118 to a greater extent. Next, hydraulic chamber 120 is defined by damper housing assembly piece 92, bushing 98, and second end portion 126 of a piston shaft 124, 126. Lastly, hydraulic chamber 122 is defined by damper housing assembly piece 92, bushing 98, second end portion 126 of a piston shaft 124, 126, translating seal plate 106, and rolling diaphragm seal 114. Hydraulic chambers 116, 118, 120, 122 are internally pressurized in the illustrated example, but may be externally pressurized in further embodiments of three parameter isolator 40.

Hydraulic chambers 118, 120 are located on opposing sides of and are fluidly partitioned, in substantial part, by damper piston 128. An annulus 130 (FIG. 4) having a relatively narrow radial gap width is defined by the outer circumferential surface of damper piston 128 and a radially-adjacent inner circumferential surface of damper housing assembly piece 92. As damper piston 128 strokes along working axis 46 (FIG. 3), the relative volumetric capacities of hydraulic chambers 118, 120 vary accordingly, and damping fluid flow is forced across annulus 130 to provide the desired damping effect. Notably, rolling seal damper assembly 68 is a rigid volume damper assembly in the illustrated example; the term "rigid volume damper assembly," as appearing herein, indicating that the cumulative volume of the hydraulic chambers located on opposing sides of the damper piston (e.g., piston 128) remains constant as the piston strokes along the working axis. In other embodiments, damper assembly 68 may not be rigid volume damper assembly and/or hydraulic fluid exchange between hydraulic chambers 118, 120 may be permitted through one or more restricted orifices other than an annulus. Substantially unrestricted damping fluid flow is also permitted from hydraulic chamber 118 to hydraulic chambers 116, 122 through a longitudinal flow channel 132 and a number of ports 134 provided in piston shaft 124, 126. Hydraulic chambers 116, 118, 120, 122 are fluid-tight and are filled with a damping fluid (not shown) prior to usage of three parameter isolator 40. Three parameter isolator 40 may initially be produced and distributed without damping fluid, which may then be introduced into hydraulic chambers 116, 118, 120, 122 through a fill port prior to isolator operation.

Figure 6:
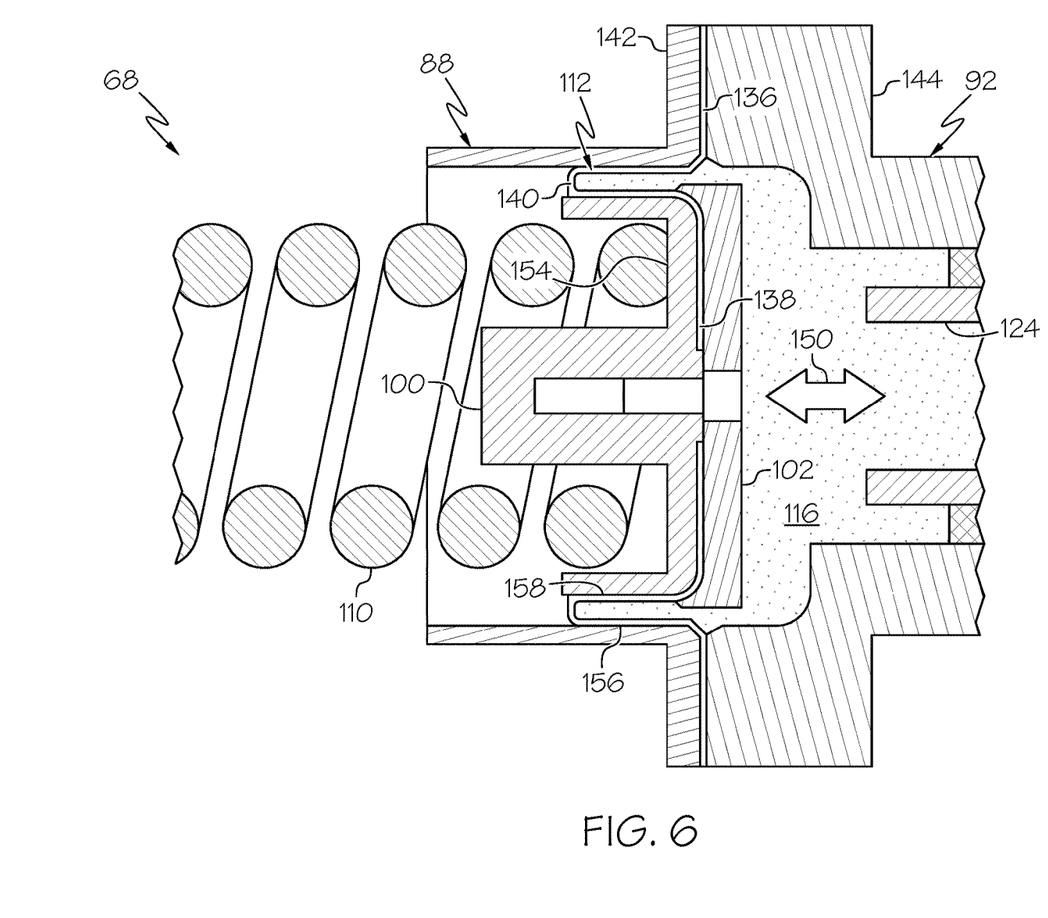
FIG. 6 is a detailed view of one of the rolling diaphragm seals and the surrounding structure included in the exemplary rolling seal damper assembly shown in FIGS. 4 and 5.

FIG. 6 illustrates rolling diaphragm seal 112 and the surrounding structure of rolling seal damper assembly 68 in greater detail. As can be seen, rolling diaphragm seal 112 is a generally annular or ring-shaped sealing element including outer annular portion or outer peripheral flange 136, an inner annular portion or inner peripheral flange 138, and an intermediate flexible rolling section or "rolling convolute" 140. Outer peripheral flange 136 is captured between a flange 142 of diaphragm seal clamp 88 and a mating flange 144 of damper housing assembly piece 92, which may be joined utilized a plurality of non-illustrated fasteners. Similarly, inner peripheral flange 148 is sealingly captured between the face of TC piston 100 and translating seal plate 102. Rolling convolute 140 flexes in a rolling motion to accommodate translation of TC piston 100 along working axis 46 (shown in FIG. 3), as indicated in FIG. 6 by double-headed arrow 150. In this regard, TC piston 100 is movable between an extended position in which the volume of hydraulic chamber 116 is least (corresponding to the rightmost end of piston travel in FIGS. 4-6) and a retracted position in which the volume of hydraulic chamber 116 is greatest (corresponding to the leftmost end of piston travel). TC preload spring 110 is compressed between an internal wall 152 of outer housing piece 50 (identified in FIG. 4) and a spring seat 154 included in TC piston 100. TC preload spring 110 thus urges movement of TC piston 100 (and therefore seal plate 102 and the inboard portions of seal 112) toward the extended position. Collectively, TC piston 100, TC preload spring 110, and hydraulic chamber 116 (also referred to as a "TC chamber") form a thermal compensator, which pressurizes the hydraulic fluid contained within rolling seal damper assembly 68 (represented in FIG. 6 by dot stippling) and which provides an increased volumetric capacity (via the retraction of TC piston 100 and the rolling action of seal 112) to accommodate thermally-induced fluctuations in damping fluid volume.

As identified in FIG. 6, diaphragm seal clamp 88 includes an inner annular sidewall 156, while TC piston 100 includes an outer annular sidewall 158 circumscribed by inner annular sidewall 156. Annular sidewalls 156, 158 serve as guideways or supports, which guide movement of rolling convolute 140 as rolling diaphragm seal 112 flexes to accommodate translation of TC piston 100. Annular sidewalls 156, 158 also prevent the outward bulging of convolute 140 in radial directions due to the interior fluid pressure within hydraulic chamber 116. Rolling diaphragm seal 112 can be fabricated from any material or materials allowing seal 112 to roll or flex in conjunction with movement of TC piston 100, while sealing the sliding interface between diaphragm seal clamp 88 (and, more generally, the static structure of rolling seal damper assembly 68) and TC piston 100. In one embodiment, rolling diaphragm seal 112 is fabricated from an elastic or non-elastic polymeric material, such as a nitrile rubber, which is reinforced with a fabric, such as a polyester backing. In other embodiments, rolling diaphragm seal 112 may be fabricated from different materials and may have various other geometries (e.g., different flanged configurations) beyond that shown in FIGS. 4-6.

In the illustrated example, rolling diaphragm seal 114 is substantially identical to rolling diaphragm seal 112. Thus, as does rolling diaphragm seal 112, rolling diaphragm seal 114 includes outer peripheral flange 160 (e.g., a first bolted flange), an inner peripheral flange 162 (e.g., a second bolted flange), and an intermediate rolling convolute 164, all of which are labeled in FIG. 5. When rolling seal damper assembly 68 is fully assembled, outer peripheral flange 160 is sealingly captured between a flange of diaphragm seal clamp 94 and the mating end of inner diameter housing assembly piece 92. Inner peripheral flange 162 is captured between tuning spring connector piece 108 and translating seal plate 106. Rolling convolute 164 contacts an outer annular sidewall 168 of diaphragm seal clamp 94 and an inner annular sidewall 170. Thus, as previously indicated, sidewalls 168, 170 guide the movement of rolling convolute 164 and prevent the undesired outward bulging of rolling diaphragm seal 114 when pressure loaded. In this manner, rolling diaphragm seal 114 flexes to accommodate relative movement between tuning spring connector piece 108 (and the adjoining end of tubular spring piece 70) relative to the static structure of damper assembly 68 (and, specifically, relative to damper housing assembly piece 92 and diaphragm seal clamp 94).

Advantageously, rolling diaphragm seals 112, 114 provide high integrity sealing of selected hydraulic chambers (i.e., hydraulic chambers 116, 122), while allowing low friction movement of TC piston 100 and damper piston structure 104 along working axis 46 (FIG. 3). Rolling diaphragm seals 112, 114, in conjunction with the other components of damper assembly 68, can provide extended, low or zero leakage operation over prolonged service periods. Additionally, rolling diaphragm seals 112, 114 may accommodate relatively broad stroke capabilities, high pressure capabilities, very low static spring rates, and long service lifespans. As a still further benefit, rolling seal damper assembly 68 can be manually dissembled and reassembled on an as-needed basis to, for example, facilitate maintenance and to allow interchange of damping fluids. While providing a number of advantages relative to other types of sealing elements, rolling diaphragm seals 112, 114 provide relatively little, if any lateral stiffness. Damper assembly 68 may therefore be further equipped with a lateral guide system, which guides movement of piston structure 104 during operation of isolator 40. Specifically, three parameter isolator 40 may be further equipped with a linear guide system, which prevents or at least significantly deters undesired, off-axis movement of piston structure 104; that is, displacement and rotation of main spring 64 along the lateral axes (the Y- and Z-axes in coordinate legend 48) orthogonal to working axis 46 (FIG. 3). The linear guide system may also likewise help guide the movement of main spring 64 by further restricting the motion of these components to axial movement along working axis 46 (FIG. 3).

In the embodiment shown in FIGS. 3-6, the linear guide system is realized through two sliding interfaces. The first sliding interface is formed between end portion 124 of piston shaft 124, 126, and bushing 96. Bushing 96 and, more generally, the first sliding interface is located between rolling diaphragm seal 112 and a first face of damper piston 128, as taken along working axis 46 (FIG. 3). The second sliding interface is formed between opposing end portion 126 of piston shaft 124, 126 and bushing 98. Bushing 98 and, more generally, the second sliding interface is thus located between rolling diaphragm seal a second, opposing face of damper piston 128 and rolling diaphragm seal 114, as taken along working axis 46 (FIG. 3). Stated differently, the sliding interfaces forming the linear guide system are located on opposing sides of damper piston 128 and between rolling diaphragm seals 112, 114, as taken along working axis 46 (FIG. 3). The sliding interfaces thus restrict linear movement of damper piston structure 104 and, therefore, damper piston 128 along axis perpendicular to working axis 46 (FIG. 3). In certain embodiments, the sliding interfaces may also include keys and keyways or similar features to restrict rotation of piston structure 104 around working axis 46; however, this is not necessary. In the context of this document, bushings 96, 98 are considered bearings (in particular, plane bearings), which circumscribe the opposing end portions of piston shaft 124, 126. In further embodiments, bushings 96, 98 can be replaced by another type of bearing, such as rolling element bearings in the form of ball bearings or roller bearings.

As previously indicated, exemplary vibration isolator 40 is a three parameter device, which provides the desirable vibration attenuation characteristics described above; e.g., a relatively low peak transmissibility and superior attenuation of high frequency vibrations. In keeping with the terminology introduced above in conjunction with FIGS. 1 and 2, $K_A$ is the axial stiffness of three parameter isolator 40, as a whole, which is predominately determined by the axial stiffness of main spring 64; KB is the volumetric stiffness of isolator 40, which is predominately determined by the axial stiffness of tuning spring 66; and CA is determined by the damping characteristics of rolling seal damper assembly 68. In the exemplary embodiment shown in FIGS. 4-6, main spring 64 ($K_A$) is coupled in parallel with tuning spring 66 (KB) and rolling seal damper assembly 68 (CA), which are coupled in series, as taken along a load transfer path extending through isolator 40. Specifically, a first or outer vibration transmission path is provided through isolator 40 progressing from isolator end 42, through outer housing piece 50, through outer housing piece 54 including through main spring 64, and to isolator end portion 44. A second or inner vibration transmission path is further provided through isolator 40 progressing from isolator end 42, through outer housing piece 52, through damper assembly 68, through tuning spring connector piece 108, through tubular spring piece 70 and tuning spring 66, and to isolator end portion 44. The portions of inner and outer vibration transmission path generally to the right of the interface of housing pieces 52, 54 (with reference to the illustrated orientation shown in FIGS. 3-5) are consequently in parallel, with the main spring 64 positioned in the outer ($K_A$) vibration transmission path and tuning spring 66 and damper assembly 68 positioned in the outer (KB-CA) vibration transmission path.

The foregoing has thus provided one or more exemplary embodiments of a three parameter isolators including rolling seal damper assemblies. The rolling seal damper assembly contains flexible rolling diaphragm seals, which seal hydraulic compartments or chambers included within the damper assembly. The rolling diaphragm seals may assume the form of, for example, substantially annular structures composed of a fiber-reinforced polymeric material and including rolling convolutes, which contact annular guide walls provided on selected components of the damper assembly. In certain embodiments, the rolling seal damper assembly may also contain a thermal compensator piston, which is sealingly attached to one of the rolling diagram seals; and/or a linear guide system, which confines off-axis movement of a damper piston structure to which at least one of the rolling diaphragm seals is sealingly attached. Relative to three parameters isolators containing conventional damper assemblies, such as damper assemblies containing edge-welded metal bellows, embodiments of the three parameter isolator can be produced at lower manufacturing costs and with greater efficiency. Concurrently, embodiments of the three parameter isolator may provide reliable, substantially frictionless, high temperature range, low to zero leakage operation, while facilitating isolator disassembly.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A three parameter isolator having a working axis, the three parameter isolator comprising:
   first and second isolator end portions opposed along the working axis;
   a main spring mechanically coupled between the first and second isolator end portions;
   a tuning spring mechanically coupled in parallel with the main spring between the first and second isolator end portions; and
   a rolling seal damper assembly mechanically coupled between the first and second isolator end portions in parallel with the main spring and in series with the tuning spring, the rolling seal damper assembly comprising:
   a first hydraulic chamber;
   a second hydraulic chamber fluidly coupled to the first hydraulic chamber;
   first and second rolling diaphragm seals partially bounding the first and second hydraulic chambers, respectively;
   a damper piston having a piston shaft, the damper piston located between the first and second rolling diaphragm seals, as taken along the working axis;
   a central flow channel formed in the piston shaft and fluidly coupling the first and second hydraulic chambers; and
   a linear guide system substantially preventing movement of the damper piston along axes perpendicular to the working axis, the linear guide system comprising first and second sliding interfaces spaced along the working axis and located on opposing sides of the damper piston.

2. The three parameter isolator of claim 1 wherein the rolling seal damper assembly further comprises a thermal compensator containing a thermal compensator piston partially defining the first hydraulic chamber, the second rolling diaphragm seal attached to the thermal compensator piston such that rolling movement of the second rolling diaphragm seal occurs in conjunction with translational movement of the thermal compensator piston.

3. The three parameter isolator of claim 2 wherein the thermal compensator piston comprises an annular sidewall wall contacting and guiding rolling movement of the first rolling diaphragm seal as the thermal compensator piston translates along the thermal compensator axis.

4. The three parameter isolator of claim 2 wherein the thermal compensator further comprises a thermal compensator spring biasing the thermal compensator piston toward an extended position, the first rolling diaphragm seal circumscribing a portion of thermal compensator spring when the thermal compensator piston resides in the extended position.

5. The three parameter isolator of claim 2 wherein the first rolling diaphragm seal has an inner peripheral flange, and wherein the thermal compensator piston comprises:
   a piston face; and
   a seal plate affixed to the piston face and partially defining the first hydraulic chamber, the inner peripheral flange of the first rolling diaphragm seal captured between the piston body and the seal plate.

6. The three parameter isolator of claim 1 wherein the linear guide system comprises a plurality of bearings located between the first and second rolling diaphragm seals, as taken along the working axis.

7. The three parameter isolator of claim 1 further comprising a housing assembly comprising:
   a first housing piece containing the first rolling diaphragm seal; and
   a second housing piece affixed to the first housing piece and containing the second diaphragm seal.

8. The three parameter isolator of claim 7 wherein the second housing piece comprises an annular sidewall in which the main spring is formed.

9. The three parameter isolator of claim 1 further comprising:
   a connector piece coupled between the tuning spring and the rolling seal damper assembly; and
   a seal plate capturing an inner annular portion of the second diaphragm seal against the connector piece.

10. The three parameter isolator of claim 1 wherein the first and second rolling diaphragm seals each comprise a fiber-reinforced polymeric material.

11. The three parameter isolator of claim 1 wherein the rolling seal damper assembly is a rigid volume damper assembly.

12. The three parameter isolator of claim 1 wherein the piston shaft comprises:
   a first end portion extending from a first face of the damper piston and partially forming the first sliding interface; and
   a second end portion extending from a second face of the damper piston and partially forming the second sliding interface.

13. A three parameter isolator, comprising:
   an outer isolator housing assembly;
   a main spring forming part of the outer isolator housing assembly;
   a tuning spring in parallel with the main spring and contained within the outer isolator housing assembly; and
   a rolling seal damper assembly in parallel with the main spring and in series with the tuning spring, the rolling seal damper assembly comprising:
   a damper piston contained within the outer isolator housing assembly;
   first and second hydraulic chambers contained within the outer isolator housing assembly;
   a first rolling diaphragm seal at least partially defining the first hydraulic chamber;
   a linear guide system having first and second sliding interfaces guiding movement of the damper piston along a working axis of the three parameter isolator, while impeding moving of the damper piston along axes perpendicular to the working axis; and
   a second rolling diaphragm seal at least partially defining the second hydraulic chamber;

wherein, as taken along the working axis, (i) the damper piston is located between the first and second sliding interfaces, (ii) the first and second sliding interfaces are located between the first and second hydraulic chambers, and (iii) the first and second hydraulic chambers are located between the first and second rolling diaphragm seals.

14. The three parameter isolator of claim 13 wherein the first and second rolling diaphragm seals are substantially coaxial with the working axis.

15. The three parameter isolator of claim 13 wherein the rolling seal damper assembly comprises:
   second and third hydraulic chambers fluidly coupled to the first hydraulic chamber and partially defined by the damper piston; and
   a fourth hydraulic chamber fluidly coupled to the first, second, and third hydraulic chambers and partially defined by the second rolling diaphragm seal.

* * * * *